United States Patent
Gregg et al.

(10) Patent No.: US 8,660,812 B2
(45) Date of Patent: Feb. 25, 2014

(54) METHODS FOR CALIBRATING OVER-THE-AIR PATH LOSS IN OVER-THE-AIR RADIO-FREQUENCY TEST SYSTEMS

(75) Inventors: Justin Gregg, San Francisco, CA (US); Tomoki Takeya, Santa Clara, CA (US); David A. Donovan, Oakland, CA (US)

(73) Assignee: Apple Inc., Cupertino, CA (US)

( * ) Notice: Subject to any disclaimer, the term of this patent is extended or adjusted under 35 U.S.C. 154(b) by 241 days.

(21) Appl. No.: 13/035,026

(22) Filed: Feb. 25, 2011

(65) Prior Publication Data

US 2012/0221277 A1     Aug. 30, 2012

Related U.S. Application Data

(60) Provisional application No. 61/351,792, filed on Jun. 4, 2010.

(51) Int. Cl.
    *G06F 19/00*      (2011.01)

(52) U.S. Cl.
USPC ............ 702/106; 455/67.11; 455/67.12; 455/115.1; 455/226.1; 340/7.41; 340/7.44

(58) Field of Classification Search
USPC ............ 702/106; 455/67.11, 67.12, 115.1, 455/226.1; 340/7.41, 7.44
See application file for complete search history.

(56) References Cited

U.S. PATENT DOCUMENTS

| | | | |
|---|---|---|---|
| 6,473,617 B1 * | 10/2002 | Larsen et al. | 455/446 |
| 6,525,657 B1 | 2/2003 | Wojcik | |
| 7,444,264 B2 | 10/2008 | Kildal | |
| 7,555,293 B2 * | 6/2009 | Qi et al. | 455/423 |
| 8,244,234 B2 * | 8/2012 | Zhu et al. | 455/423 |
| 8,412,112 B2 * | 4/2013 | Foegelle | 455/67.12 |
| 2005/0038863 A1 * | 2/2005 | Onyon et al. | 709/207 |
| 2007/0207758 A1 * | 9/2007 | Qi et al. | 455/226.2 |
| 2007/0216880 A1 * | 9/2007 | Qi et al. | 355/53 |
| 2007/0243826 A1 | 10/2007 | Liu | |
| 2008/0129615 A1 * | 6/2008 | Breit et al. | 343/703 |

(Continued)

OTHER PUBLICATIONS

3GPP TR 37.976:"3rd Generation Partnership Project;Technical Specification Group Radio Access Networks; Measurement of radiated performance for MIMO and multi-antenna reception for HSPA and LTE terminals", Release 10, v1.1.0 (May 2010).*

(Continued)

*Primary Examiner* — John E Breene
*Assistant Examiner* — Ruihua Zhang
(74) *Attorney, Agent, or Firm* — Treyz Law Group; Jason Tsai (57) ABSTRACT

Calibration equipment for calibrating multiple test stations in a test system is provided. Each test station may include a test unit, a test chamber with an over-the-air antenna, and a radio-frequency (RF) cable that connects the test unit to the test chamber. Reference devices under test (DUTs) may be used to calibrate uplink and downlink path loss (e.g., OTA path loss, RF cable path loss, and variations of the test unit) associated with each test station. The reference DUTs may calibrate each test station at desired frequencies to generate a path loss table. Once calibrated, the test chambers may be used during production testing to test factory DUTs. During production testing, the transmit/receive power efficiency of each factory DUT may be calculated based on values in the path loss table to determine whether a particular production DUT is a passing or failing DUT according to pass/fail criteria.

18 Claims, 9 Drawing Sheets

(56) References Cited

U.S. PATENT DOCUMENTS

| | | | |
|---|---|---|---|
| 2008/0311871 A1* | 12/2008 | Qi et al. | 455/226.2 |
| 2009/0305654 A1* | 12/2009 | Qi et al. | 455/226.4 |
| 2010/0283689 A1* | 11/2010 | Waltho | 343/702 |
| 2010/0285753 A1* | 11/2010 | Foegelle | 455/67.12 |
| 2011/0084887 A1* | 4/2011 | Mow et al. | 343/703 |
| 2012/0052815 A1* | 3/2012 | Chang et al. | 455/67.11 |
| 2012/0052816 A1* | 3/2012 | Chang et al. | 455/67.12 |
| 2012/0053879 A1* | 3/2012 | Chang et al. | 702/104 |
| 2012/0098713 A1* | 4/2012 | Mow et al. | 343/703 |

OTHER PUBLICATIONS

G. Masters, et al., "An inroductin to mobile station over-the-air measurements", 2006, Delta-ww2.nearfield.com.*

* cited by examiner

| SLAVE TEST CHAMBER #1 | | | | |
|---|---|---|---|---|
| UPLINK { | BAND1 | REF DUT1 | REF DUT2 | ••• |
| | CH1 | 20, 21, 23 | 20, 21, 28 | |
| | CH2 | 19, 18, 19 | 25, 19, 18 | |
| | ⋮ | | | |
| | BAND2 | REF DUT1 | REF DUT2 | ••• |
| | ⋮ | | | |
| DOWNLINK { | BAND1 | REF DUT1 | REF DUT2 | ••• |
| | CH1 | 30, 31, 33 | 30, 29, 30 | |
| | CH2 | 29, 28, 30 | 28, 37, 32 | |
| | ⋮ | | | |
| | BAND2 | REF DUT1 | REF DUT2 | ••• |
| | ⋮ | | | |

METHODS FOR CALIBRATING OVER-THE-AIR PATH LOSS IN OVER-THE-AIR RADIO-FREQUENCY TEST SYSTEMS

This application claims the benefit of provisional patent application No. 61/351,792, filed Jun. 4, 2010, which is hereby incorporated by reference herein in its entirety.

BACKGROUND

This relates generally to testing wireless electronic devices, and more particularly, to calibrating test equipment that is used to test wireless electronic devices.

Wireless electronic devices typically include transceiver circuitry, antenna circuitry, and other radio-frequency circuitry that provides wireless communications capabilities. During testing, wireless electronic devices under test (DUTs) can exhibit different performance levels. For example, each wireless DUT in a group of DUTs can exhibit its own output power level, gain, frequency response, efficiency, linearity, dynamic range, etc.

The performance of a wireless DUT can be measured using an over-the-air (OTA) test station. An OTA test station includes a test chamber with an OTA antenna, a test unit, and a test host. The OTA antenna is connected to the test unit and is used in sending and receiving radio-frequency (RF) signals to and from the test unit. The test host is connected to the test unit and directs the test unit to perform desired functions during testing.

During test operations, a wireless DUT is placed into the test chamber and communicates wirelessly with the OTA antenna in the test chamber. Wireless transmissions of this type experience OTA path loss between the DUT antenna and the OTA antenna. Downlink and uplink OTA path loss can be respectively defined as the power attenuation of a radio-frequency signal as it propagates from the OTA antenna of the test chamber to the antenna circuitry of the wireless DUT and as the power attenuation of an RF signal as it propagates from the antenna circuitry of the wireless DUT to the OTA antenna of the test chamber.

An OTA test system typically includes multiple OTA test stations that are used to test multiple wireless DUTs in parallel. Each OTA test station typically includes its own test chamber, test unit, and test host. A production DUT is placed into the test chamber of each test station during product testing. Typical product testing involves measuring the wireless performance of each DUT and applying pass/fail criteria.

The radio-frequency path of each test station has its own unique OTA path loss characteristic. These unique path losses should be taken into account for accurate testing. In an effort to take into account these OTA path loss variations between test stations, a "golden" reference DUT is used to calibrate each test station. A golden reference DUT is a carefully selected DUT that exhibits desired wireless performance. Typically, a limited number of golden reference DUTs are produced, and each golden reference DUT has a limited testing lifetime. As a result, it can be difficult and costly to distribute the golden reference DUTs to different test sites for calibrating test stations.

It would therefore be desirable to be able to provide improved calibration techniques for calibrating OTA test systems.

SUMMARY

Production devices under test (DUTs) may be tested using calibrated slave test chambers. The slave test chambers may be located at geographically diverse test sites.

A golden reference DUT may be produced. For example, a golden reference DUT may be calibrated in a golden reference DUT calibration chamber to determine precise performance characteristics associated with the golden reference DUT or the golden reference DUT may be carefully selected from a group of DUTs based on performance criteria.

The golden reference DUT may be used to calibrate a master test chamber to determine master test chamber uplink and downlink path loss values. Once calibrated, the master test chamber can be used to calibrate a series of reference DUTs and, in performing these calibration operations, to determine reference DUT offset values relative to the performance of the golden reference DUT. Numerous (e.g., ten or more) reference DUTs may be produced using the master test chamber. The reference DUT offset values may be stored in each reference DUT or may be stored in a database.

Multiple reference DUTs may be distributed to each test site to calibrate the slave test chambers at that site. A test site typically has multiple slave test stations. Each test station may include a slave test chamber with an over-the-air (OTA) antenna, a test unit, and a test host. Each test station may be connected to computing equipment over a network. A database (e.g., a database on which the reference DUT offset values are stored) may be implemented on the computing equipment.

Multiple reference DUTs may be used in calibrating each slave chamber. Uplink and downlink path loss characteristics associated with that slave test chamber can be determined by taking into account the reference DUT offset information for each reference DUT. The slave test chamber path loss values may be measured at desired frequencies (e.g., at desired frequency bands and channels) and may be tabulated in a calibrated path loss table that is stored in the database.

Once calibrated using the reference DUTs, the slave test chambers may be used to test production DUTs during product testing (e.g., pass/fail testing). The transmit and receive power levels and therefore the efficiency of each production DUT may be measured based on average slave test chamber path loss values (e.g., average values computed based on the mean of path loss values in the calibrated path loss table). Pass/fail criteria may be applied to the measured transmit and receive power level and efficiency data to determine whether a production DUT is a passing DUT or a failing DUT.

Further features of the present invention, its nature and various advantages will be more apparent from the accompanying drawings and the following detailed description.

DETAILED DESCRIPTION

Wireless electronic devices include antenna and transceiver circuitry that supports wireless communications. Examples of wireless electronic devices include desktop computers, computer monitors, computer monitors containing embedded computers, wireless computer cards, wireless adapters, televisions, set-top boxes, gaming consoles, routers, or other electronic equipment. Examples of portable wireless electronic devices include laptop computers, tablet computers, handheld computers, cellular telephones, media players, and small devices such as wrist-watch devices, pendant devices, headphone and earpiece devices, and other miniature devices.

Devices such as these are often provided with wireless communications capabilities. For example, electronic devices may use long-range wireless communications circuitry such as cellular telephone circuitry to communicate using cellular telephone bands at 850 MHz, 900 MHz, 1800 MHz, and 1900 MHz (e.g., the main Global System for Mobile Communications or GSM cellular telephone bands). Long-range wireless communications circuitry may also handle the 2100 MHz band.

Electronic devices may use short-range wireless communications links to handle communications with nearby equipment. For example, electronic devices may communicate using the WiFi® (IEEE 802.11) bands at 2.4 GHz and 5 GHz and the Bluetooth® band at 2.4 GHz. It is sometimes desirable to receive satellite navigation system signals such as signals from the Global Positioning System (GPS). Electronic devices may therefore be provided with circuitry for receiving satellite navigation signals such as GPS signals at 1575 MHz.

Figure 1:
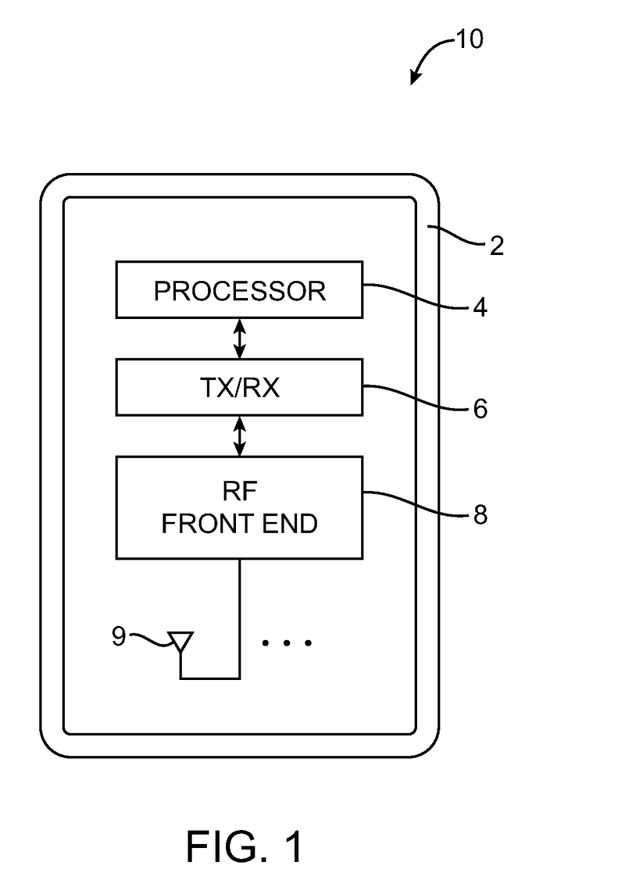
FIG. 1 is a diagram of an illustrative wireless device under test (DUT) with radio-frequency circuitry in accordance with an embodiment of the present invention.

In testing environments, the wireless electronic devices are sometimes referred to as devices under test (DUTs). FIG. 1 shows an example of a test device such as DUT 10. DUT 10 may be a portable electronic device, a computer, a multimedia device, or other electronic equipment. DUT 10 may have a device housing such as housing 2 that forms a case for its associated components.

DUT 10 may have a processor such as processor 4. Processor 4 may be used in controlling the operation of DUT 10. Processor 4 may include storage and one or more processing circuits. Examples of circuits that may be used in implementing processor 4 include microprocessors, baseband processors, digital signal processors, microcontrollers, application-specific integrated circuits, etc.

Processor 4 may interact with a transceiver circuit such as transceiver circuit 6. Transceiver circuit 6 may include an analog-to-digital converter (ADC), a digital-to-analog converter (DAC), a digital down-converter (DDC), and a digital up-converter (DUC).

In a scenario in which DUT 10 is transmitting, processor 4 may provide digital data (e.g., baseband signals) to the DUC. The DUC may convert or modulate the baseband digital signals to an intermediate frequency (IF). The IF digital signals may be fed to the DAC to convert the IF digital signals to IF analog signals. The IF analog signals may then be fed to an RF front end such as RF front end 8.

When DUT 10 is receiving wireless signals, RF front end 8 may provide incoming IF analog signals to the ADC. The ADC may convert the incoming IF analog signals to incoming IF digital signals. The incoming IF digital signals may then be fed to the DDC. The DDC may convert the incoming IF digital signals to incoming baseband digital signals. The incoming baseband digital signals may then be provided to processor 4 for further processing. Transceiver circuit 6 may either up-convert baseband signals to IF signals or down-convert IF signals to baseband signals. Transceiver block 6 may therefore sometimes be referred to as an IF stage.

RF front end 8 may include circuitry that couples transceiver block 6 to one or more antenna such as antenna 9. RF front end 8 may include circuitry such as matching circuits, band-pass filters, mixers, low noise amplifier circuitry, power amplifier circuitry, etc. Processor 4, transceiver block 6, RF front end 8, and antenna 9 may be housed within housing 2.

In the scenario in which DUT 10 is transmitting, RF front end 8 may up-convert the IF analog signals from transceiver block 6 to RF analog signals (e.g., the RF signals typically have higher frequencies than the IF signals). The RF analog signals may be fed to antenna 9 for broadcast. If desired, more than one antenna may be used in DUT 10.

In the scenario in which DUT 10 is receiving wireless signals, antenna 9 may receive incoming RF analog signals from a broadcasting device such as a base transceiver station, network access point, etc. The incoming RF analog signals may be fed to RF front end 8. RF front end 8 may down-convert the incoming RF analog signals to IF analog signals. The IF analog signals may then be fed to transceiver circuit 6 for further data processing.

Figure 2:
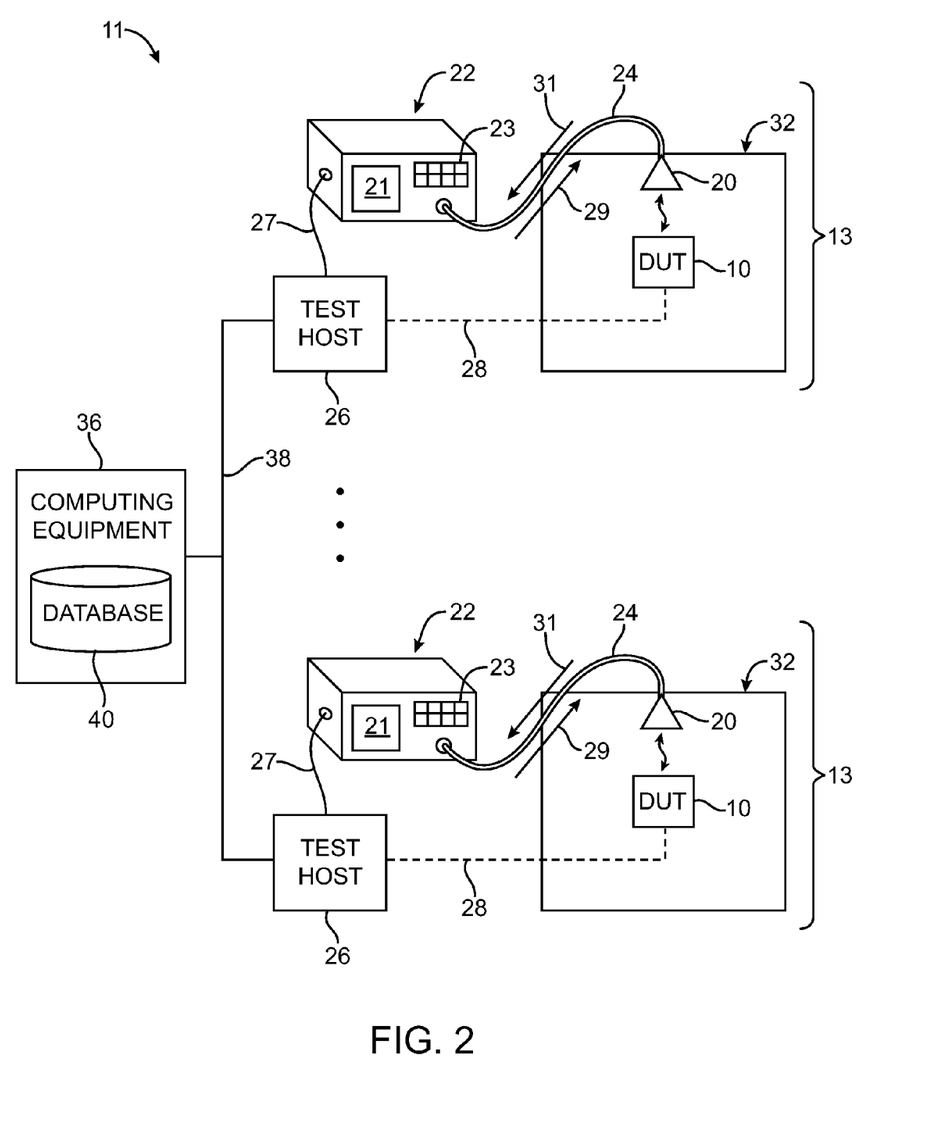
FIG. 2 is a diagram of illustrative test stations each connected to computing equipment and each including a test chamber, a test unit, and a test host in accordance with an embodiment of the present invention.

During product testing, many wireless devices (e.g., hundreds, thousands, or more of DUTs 10) may be tested in a test system such as test system 11 of FIG. 2. Test system 11 may include multiple test stations such as test stations 13. Each test station 13 may include a slave test chamber such as slave test chamber 32 (shown as calibrated slave test chamber 32' in FIG. 4), a test unit such as test unit 22, a radio-frequency (RF) cable 24 that connects chamber 32 to test unit 22, and a test host such as test host 26 (e.g., a personal computer). Test chambers that are used during product testing to measure the performance of production (factory) DUTs are sometimes referred to herein as "slave" test chambers.

Each test chamber 32 may have a cubic structure (six planar walls), a rectangular prism-like structure (six rectangular walls), a pyramid structure (four triangular walls with a rectangular base), or other suitable structures.

Test chambers 32 may each have an over-the-air (OTA) antenna such as OTA antenna 20 mounted inside the chamber. During product testing, DUT 10 may be placed inside test chamber 32 to test for the performance (e.g., output power level, input sensitivity, etc.) of DUT 10 while OTA antenna 20 communicates wirelessly with antenna(s) 9 of DUT 10.

Test unit (tester) 22 in each test station 13 may be a radio communications tester of the type that is sometimes referred to as a test box or a radio communications tester. Test unit 22 may be used to perform radio-frequency signaling tests for a variety of different radio-frequency communications bands and channels.

Test unit 22 may be operated directly or via computer control (e.g., when test unit 22 receives commands from test host 26). When operated directly, a user may control test unit 22 by supplying commands directly to the test unit using the user input interface of the test unit. For example, a user may press buttons in a control panel 23 on the test unit while viewing information that is displayed on a display 21 in the test unit. In computer controlled configurations, a test host such as computer 26 (e.g., software running autonomously or semi-autonomously on the computer) may communicate with the test unit (e.g., by sending and receiving data over a wired path 27 or a wireless path between the computer and the test unit). If desired, DUT 10 may also send and receive data over a wired path 28 or a wireless path between computer 26 and DUT 10, as shown in FIG. 2.

Test unit 22 may be connected to OTA antenna 20 of test chamber 32' through RF cable 24. Test station 13 with test unit 22 connected to OTA antenna 20 of test chamber 32' using RF cable 24 in this way may be used to perform OTA testing of wireless electronic devices. For example, a DUT 10 may be placed within test chamber 32' during product testing. In this arrangement, RF signals may be conveyed between transceiver circuitry 6 of DUT 10 and test unit 22.

Test unit 22 may be used to characterize uplink and downlink behaviors of DUT 10. During uplink characterization, DUT 10 may send wireless signals through RF cable 24 in the direction of arrow 31. Test unit 22 may be used to measure an output power level, frequency response, gain, linearity, and other performance parameters of DUT 10 at desired frequencies.

During downlink characterization, test unit 22 may be used to send wireless signals through RF cable 24 in the direction of arrow 29. Measurements such as a receive power level may then be taken at the DUT 10. Test stations 13 may therefore be referred to as bidirectional, because test stations 13 can be used to measure both uplink and downlink characteristics.

Each test station 13 should be calibrated prior to testing to ensure that measurements taken across the different test stations are consistent with one another. Sources of offset (error) that may exist from one test station to another include OTA path loss (e.g., path loss associated with the propagation of radio-frequency signals as they propagate through air, path loss associated with the behavior of each OTA antenna 20 during actual wireless transmission, etc.), RF cable path loss (e.g., path loss associated with each RF cable 24), and variations in each test unit 22 (e.g., process, voltage, and temperature variations that may affect the operation of each tester).

Path loss can be defined as the attenuation in power as wireless signals propagate through a particular medium. The OTA path loss and RF cable path loss in each test station 13 are typically unique, because it is challenging to manufacture test components (e.g., OTA antennas 20, RF cables 24, etc.) that are exactly identical to one another and to configure each test station 13 with an identical spatial arrangement. Path loss is sensitive to the location of OTA antenna and to the placement of DUT 10 within the test chamber.

Similarly, the manufacturing of identical test units 22 may be equally if not even more challenging. In addition to manufacturing variations, operational variations such as voltage and temperature variations may cause each test unit 22 to behave differently during actual testing conditions.

As a result, it may be necessary to take into account an overall test station path loss (e.g., it is necessary to calibrate the OTA path loss, RF cable path loss, and test unit variations) when calibrating a test station 13.

Uplink and downlink path loss may be different depending on the type of communications protocol used during testing. For example, wireless devices that support frequency division duplexing (FDD) protocols such as the Global System for Mobile Communications (GSM) standard and the Universal Mobile Telecommunications System (UMTS) protocol may exhibit an uplink path loss of 28 dB and a downlink path loss of 30 dB. A discrepancy between the uplink and downlink path loss exists in frequency division duplexing systems, because the transmitter and receiver operate at different carrier frequencies. As a result, the impedance seen at the transmit (TX) circuitry (e.g., power amplifier circuitry) and the impedance seen at the receive (RX) circuitry (e.g., low noise amplifier circuitry) may be different, thereby resulting in different uplink and downlink performance.

Uplink and downlink path loss may be approximately equal for wireless devices that support time division duplexing (TDD) protocols such as IEEE 802.11 protocols (sometimes referred to as WiFi® protocols), the Bluetooth® protocol, etc. For example, wireless devices that support time division duplexing protocols may exhibit an uplink path loss of 29 dB and a downlink path loss of 29 dB. For TDD systems, calibration of only one path (i.e., calibration of uplink path loss or downlink path loss) is necessary, because the transmit circuitry and receive circuitry operate at the same frequency.

Calibration techniques that take into account the OTA path loss, RF cable path loss, and test unit variations of each test station is desirable. To calibrate different test stations 13 in test system 11, numerous reference DUTs may be used to reliably calibrate each test station 13 (e.g., to accurately determine the amount of path loss associated with each test station 13).

For example, consider a scenario in which a reference DUT is used to characterize a slave test chamber uplink path loss. The reference DUT may, as an example, output a precise known output power level of 30 dBm. Power in terms of dBm expresses power relative to 1 mW in units of decibels. The reference DUT may be placed within a first slave test chamber of a first test station 13. A first test unit 22 of first test station 13 may be used to measure the output power level of the wireless signals that are transmitted from the reference DUT. First test unit 22 may measure a receive power level of 2 dBm (as an example). The uplink path loss of first test station 13 may therefore have a value of 28 dB (30 minus 2).

To calibrate another test station, the reference DUT may be place within a second slave test chamber of a second test station 13. A second test unit 22 of second test station 13 may be used to measure the output power level of the wireless signals that are transmitted from the reference DUT. Second test unit 22 may measure a receive power level of 3 dBm (as an example). The uplink path loss of second test station 13 may therefore have a value of 27 dB (30 minus 3).

The uplink path loss values of each test station 13 may be measured across different operating frequencies using this approach. The downlink path loss may also be measured using reference DUTs.

Consider another scenario in which the reference DUT includes circuitry that detects a receive power level for incoming wireless signals during downlink operations. The reference DUT may, for example, compute and transmit a received signal strength indicator (RSSI) that reveals the power of received RF signals during protocol-compliant testing. Other suitable ways of detecting the receive power level may be used, if desired.

The reference DUT may be placed in a first slave test chamber of a first test station 13. A first test unit 22 of first test station 13 may be set to transmit wireless signals at a requested power level of −60 dBm (as an example). The reference DUT may, for example, respond by sending an RSSI indicating a receive power of −90 dBm. The downlink path loss of first test station 13 may therefore have a value of 30 dB (−60 minus −90).

To calibrate another test station, the reference DUT may be placed in a second slave test chamber of a second test station 13. A second test unit 22 of second test station 13 may be set to transmit wireless signals at a requested power level of −60 dBm (as an example). The reference DUT may, for example, responding by sending an RSSI indicating a receive power of −88 dBm. The downlink path loss of second test station 13 may therefore have a value of 28 dB (−60 minus −88). Downlink path loss may be measured at different operating frequencies, if desired. For increased accuracy, multiple reference DUTs may be used to characterize uplink and downlink path loss for each test station.

Figure 3:
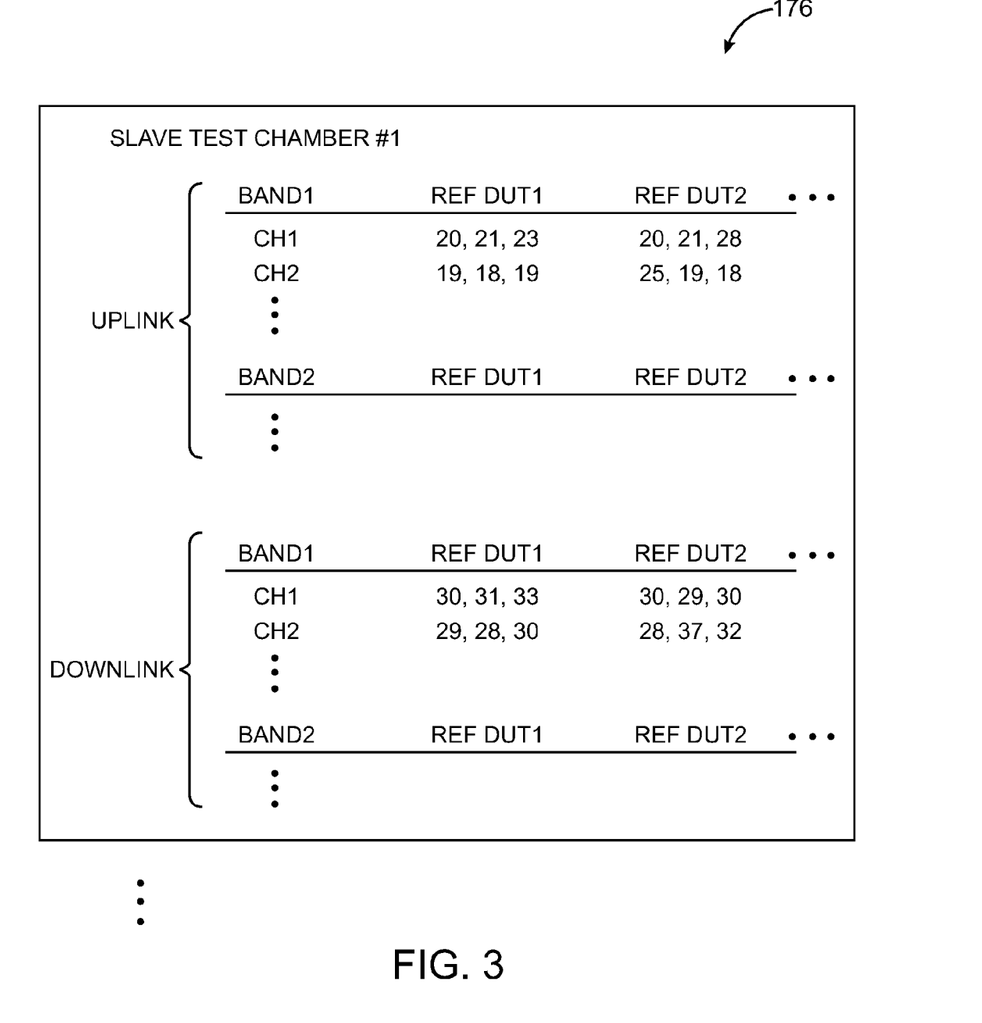
FIG. 3 is an illustrative table of slave test chamber path loss values in accordance with an embodiment of the present invention.

The uplink and downlink path loss values gathered from each slave test chamber using the reference DUTs may be tabulated in a calibrated slave test chamber path loss table such as table 176, as shown in FIG. 3. Path loss table 176 may have uplink and downlink path loss values corresponding to different operating frequencies (e.g., table 176 has path loss values for each channel in each band) for each test station 13 measured using multiple reference DUTs (see, e.g., REF DUT1 and REF DUT2 in FIG. 3).

For example, an average uplink path loss of 21.33 dB ((20+21+23)/3) may be computed based on the uplink path loss values provided in table 176 for channel CH1, band BAND1. Similarly, an average downlink path loss of 29 dB ((29+28+30)/3) may be computed based on the downlink path loss values provided in table 176 for CH2, BAND1 (as examples). Uplink and downlink path loss values may be measured at desired frequencies (i.e., for any number of bands and channels) using reference DUTs and tabulated in table 176, if desired. Table 176 may have uplink and downlink path loss values for any number of slave test chambers.

As shown in FIG. 2, each test station 48 may be connected to computing equipment 36 through line 38. Computing equipment 36 may include storage equipment on which a database 40 is stored. Table 176 may be stored in database 40. During product testing, measurements taken from production DUTs may be offset by an amount based on the path loss values in table 176 so that DUT measurements taken across each test station 13 in test system 11 are consistent and comparable.

Figure 4:
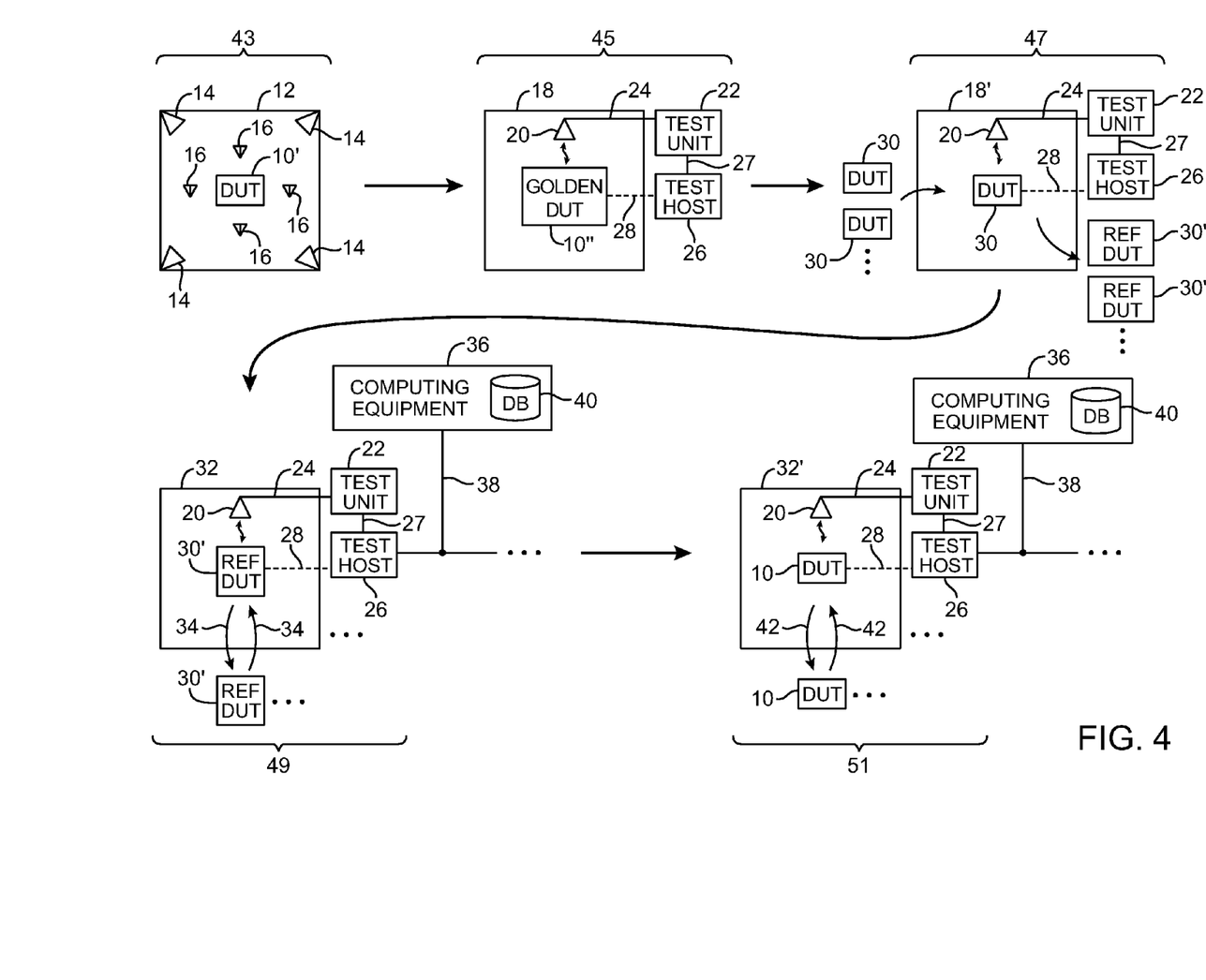
FIG. 4 is a diagram showing illustrative test chambers and steps involved in calibrating master/slave test chambers in accordance with an embodiment of the present invention.

FIG. 4 illustrates a general flow of steps involved in calibrating slave test chambers in preparation for production testing. A DUT such as DUT 10' may first be calibrated in a golden reference DUT calibration chamber 12 or may be hand-picked from a group of DUTs (step 43). Golden reference DUT calibration chamber 12 may include dedicated RX antennas such as antennas 14 and dedicated TX OTA antennas such as OTA antennas 16 that surround DUT 10' during calibration of DUT 10'. Chamber 12 may be larger and may include test equipment that can perform more accurate calibration measurements compared to a slave test chamber that is used for product testing.

Once DUT 10' has been calibrated in golden reference DUT calibration chamber 12 or has been carefully selected from a group of DUTs (i.e., the behavior of DUT 10' is known and predictable), DUT 10' can serve as a "golden" reference DUT 10". Golden reference DUT 10" is a carefully calibrated DUT (i.e., a master reference device) on which all other OTA calibration processes are based. If desired, golden reference DUT 10" may be a carefully selected DUT that exhibits an average performance level in a large sample of DUTs 10.

An uncalibrated master test chamber 18 may be calibrated using golden reference DUT 10" (step 45). Golden reference DUT 10" may be placed in master test chamber 18 to measure golden DUT master test chamber uplink and downlink path loss associated with master test chamber 18. Once master test chamber 18 has been calibrated by golden reference DUT 10", test chamber 18 becomes a calibrated master test chamber 18'.

Calibrated master test chamber 18' may be used to calibrate and produce reference DUTs (step 47). A test DUT such as test DUT 30 may be placed in master test chamber 18' for calibration. Test DUTs 30 may be taken from a sample of production DUTs 10.

Test DUT 30 may be tested in master test chamber 18' to produce TX/RX (uplink/downlink) reference DUT offset values. The reference DUT offset values may be computed based on the master test chamber uplink and down path loss that was computed previously during step 45.

For example, during uplink calibration of DUT 30, DUT 30 may be directed to output RF signals at 30 dBm. If the master test chamber uplink path loss is 28.5 dB (e.g., an uplink path loss that was determined using the golden reference DUT), test unit 22 that receives the RF signals from chamber 18' should sense a power level of 1.5 dBm (30 minus 28.5). In practice, test unit 22 may instead measure a power level of 0.5 dBm. A TX (uplink) offset of −1 dB (0.5 minus 1.5) in this example indicates that DUT 30 has an antenna 9 that transmits wireless signals with an additional 1 dB extra loss relative to the transmit power efficiency of golden reference DUT 10".

During downlink calibration of DUT 30, test unit 22 may be directed to output RF signals at −60 dBm (as an example). If the master test chamber downlink path loss is 29 dB (e.g., a downlink path loss that was determined using the golden reference DUT), DUT 30 that receives RF signals from test unit 22 should detect a power level of −89 dBm (−60 minus 29). In practice, DUT 30 may instead detect a power level of −88.4 dBm. An RX (downlink) offset of +0.6 dB (−88.4 minus −89) in this example indicates that DUT 30 has an antenna 9 that experiences 0.6 dB less power loss relative to the receive power efficiency of golden reference DUT 10".

Test DUT 30 becomes a reference DUT 30' once its TX/RX offset values have been computed. The TX/RX offset values may be stored in DUT 30 or may be stored in a test host that is coupled to chamber 18' for later use. Reference DUT 30' may be calibrated at the desired frequencies. Numerous DUTs 30 may be calibrated in master test chamber 18' to produce numerous reference DUTs 30', as shown in FIG. 4.

Test sites may be located in different geographic regions. Each test site may have multiple test stations with uncalibrated slave test chambers 32 that are interconnected in a network (e.g., each slave test chamber 32 may be connected to computing equipment 36). It may be necessary to calibrate each slave test chamber 32 in each test site to ensure that consistent and comparable measurements are taken at each test station during product testing.

In an effort to efficiently calibrate slave test chambers 32 at different geographic locations, multiple reference DUTs 30' may be distributed to each test site to calibrate each test station.

For example, a reference DUT 30' may be placed in an uncalibrated slave test chamber 32, as shown in step 49 in FIG. 4. In this example, reference DUT 30' may have TX/RX reference DUT offset values of +0.2 dB and −1.1 dB, respectively. During uplink calibration, test host 26 may compute a raw uplink path loss value of 29.7 dB. The actual uplink path loss of the slave test chamber should take into account the TX offset of reference DUT 30'. As a result, test host 26 may compute a slave test chamber uplink path loss value of 29.5 dB (29.7 minus +0.2).

One suitable way of applying the TX/RX reference DUT offset values is to store the offset values in DUT 30', which may then be retrieved by test host 26 during computation of the slave test chamber uplink and downlink path loss. In another suitable arrangement, the offset values may be stored in database 40 in computing equipment 36. In this arrangement, test host 26 may retrieve the desired offset values from database 40 during computation of the slave test chamber path loss. In another suitable arrangement, the offset values may be applied internally to DUT 30' (e.g., DUT 30' may provide an RSSI that already takes into account the TX/RX offset). If desired, techniques for applying the TX/RX reference DUT offset values to compute the slave test chamber uplink and downlink path loss may be used.

Multiple reference DUTs 30' may be switched into chamber 32 to calibrate each test slave test chamber 32 to ensure accuracy of the calibration process (see, e.g., arrows 34 in step 49 of FIG. 4). Using multiple reference DUTs 30' to calibrate the slave test chamber path loss for each test station generates values for table 176 of FIG. 3.

Calibrating each slave test chamber 32 using n reference DUTs 30' while taking into account the TX/RX offset is effectively the same as calibrating each slave test chamber 32 using n golden reference DUTs 10", because the offset values are computed relative to a golden reference DUT 10" in a control test chamber (i.e., calibrated master test chamber 18'). Calibrating slave test chambers using multiple reference DUTs 30' in this way may be desirable, because producing numerous golden reference DUTs and then distributing them may be impractical and costly. If desired, multiple (e.g., 10 or fewer) golden reference DUTs 10" may be used to calibrate one or more master test chambers. The calibrated master test chamber may then be used to produce numerous (e.g., 50 or more) reference DUTs 30' that can be distributed to different test sites.

Uncalibrated slave test chambers 32 may become calibrated slave test chambers 32' once they have been calibrated using reference DUTs 30'. Calibrated slave test chambers 32' may then be used to test production DUTs 10 during product testing (step 51). Production DUTs 10 may be tested one at a time in slave test chamber 32', as shown by arrows 42 in step 51 in FIG. 4.

Each production DUT 10 may be tested according to pass/fail criteria (e.g., criteria that specifies that DUT 10 cannot deviate too much from an expected TX/RX behavior). For example, consider a scenario in which DUT 10 is measured for it's transmit (TX) efficiency. DUT 10 may be directed to output a power level of 30 dBm in a slave test chamber 32' that has a slave test chamber uplink path loss value of 28 dB based on an average value provided by table 176. If test unit 22 measures a power of 1.2 dB, the actual output power of DUT 10 is 29.2 dBm (1.2 plus 28). A TX efficiency loss of 0.8 dB (30 minus 29.2) may be acceptable, thereby passing the pass/fail criterion. However, if test unit 22 measures a power of −2 dB, then the actual output power of DUT 10 is 26 dBm (−2 plus 28). A TX efficiency loss of 4 dB (30 minus 26) may be unacceptable, thereby failing the pass/fail criterion. DUT 10 may then be marked as a failing device.

For downlink testing of production DUTs 10 in calibrated slave test chambers 32', the receive power of DUT 10 is detected. Test unit 22 may be directed to output RF signals at −50 dBm in a slave test chamber' that has a slave test chamber downlink pass loss value of 29 dB based on an average value provided by table 176. If DUT 10 detects an RX power level of −80 dBm, then there is an RX power loss of 1 dB (−50 minus 29 minus −80), which may be acceptable. However, if DUT 10 detects an RX power level of −84 dBm, there is an RX power loss of 5 dB (−50 minus 29 minus −84), which may render DUT 10 a failing device. Uplink and downlink pass/fail tests for production DUTs 10 may be performed at the desired frequencies.

Figure 5:
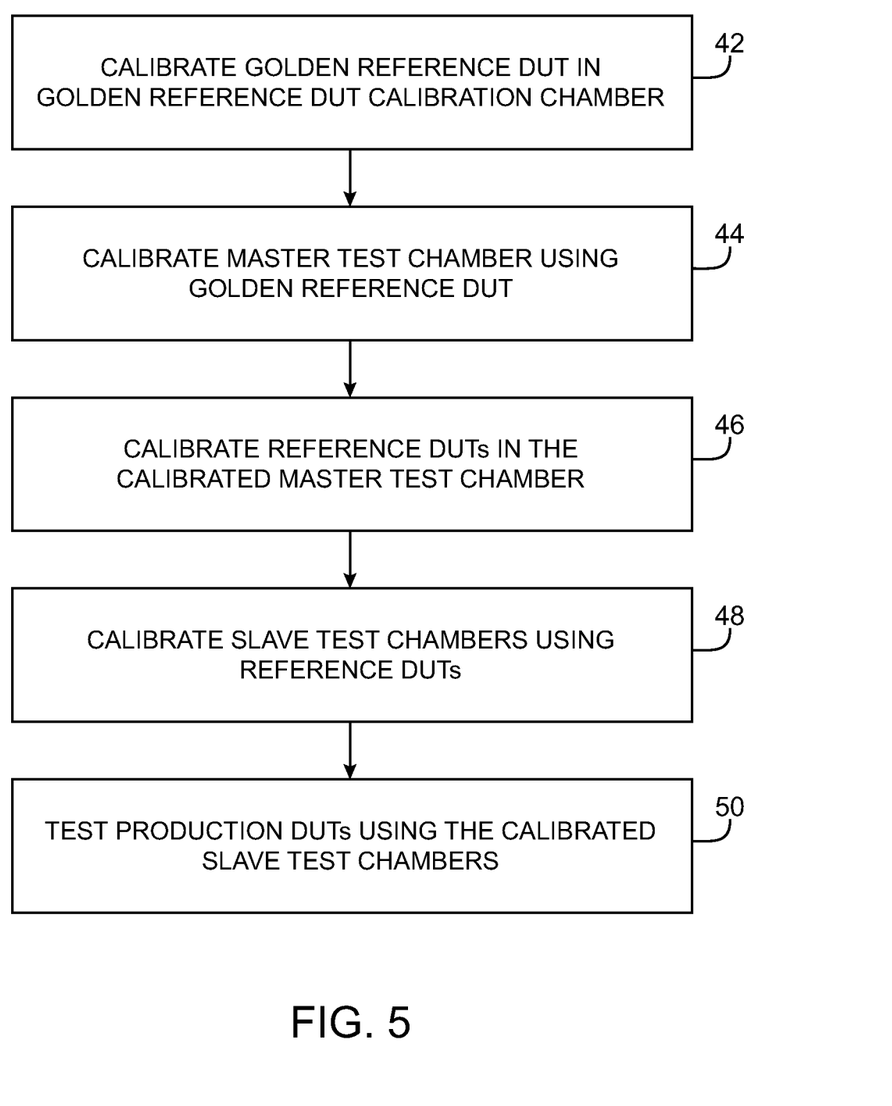
FIG. 5 is a flow chart of illustrative steps involved in calibrating multiple slave test chambers in preparation for product testing in accordance with an embodiment of the present invention.

FIG. 5 shows illustrative steps involved in calibrating slave test chambers for use in production testing. At step 42, a DUT may be calibrated using golden reference DUT calibration chamber 12 to produce golden reference DUT 10" (see, e.g., FIG. 4) or a golden reference DUT may be produced by selecting a satisfactory DUT from a group of DUTs. If desired, more than one golden reference DUT 10" may be calibrated using chamber 12.

At step 44, golden reference DUT 10" may be used to calibrate master test chamber 18 to determine master test chamber uplink/downlink path loss. Once calibrated using golden reference DUT 10', calibrated master test chamber 18' can be used to calibrate DUTs 30 to produce reference DUTs 30' (step 46). During calibration of each reference DUT 30', the reference DUT offset may be computed based on the master test chamber path loss and the path loss associated with the reference DUT (e.g., path loss computed while reference DUT 30' is in master test chamber 18').

At step 48, reference DUTs 30' may be used to calibrate slave test chambers 32 to determine the slave test chamber (uplink/downlink) path loss. The slave test chamber path loss may be based on the path loss computed using reference DUTs 30' while taking into account the reference DUT offset.

At step 50, calibrated slave test chambers 32' may be used during product testing to test production (factory) DUTs 10. The performance of each production DUT 10 may be computed based on the requested output power level and the slave test chamber path loss of the slave test chamber in which the production DUT is tested.

Figure 6:
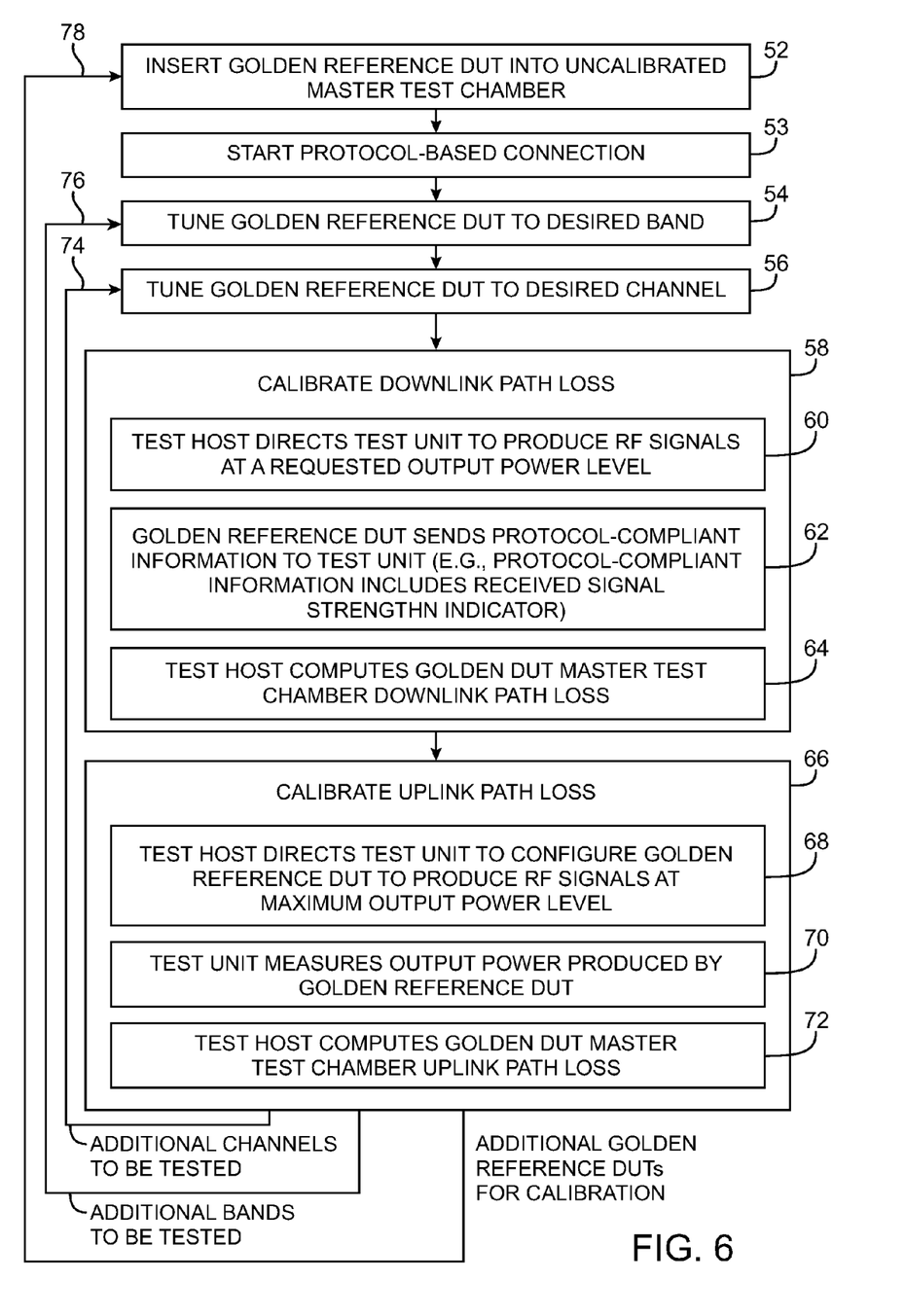
FIG. 6 is a flow chart of illustrative steps involved in calibrating a master test chamber using a golden reference DUT in accordance with an embodiment of the present invention.

FIG. 6 shows detailed steps (i.e., detailed steps that may be performed during step 44 of FIG. 5) involved in calibrating master test chamber 18 using golden reference DUT 10". At step 52, golden reference DUT 10" may be placed into an uncalibrated master test chamber 18. At step 53, test host 26 may direct golden reference DUT 10" to establish a protocol-based connection (e.g., a frequency division duplexing protocol such as GSM) between antenna 9 of DUT 10" and OTA antenna 20 of master test chamber 18 by sending commands over line 28 (as an example).

At step 54, golden reference DUT 10" may be tuned to a desired frequency band. At step 56, golden reference DUT 10" may be tuned to a desired channel within the desired frequency band.

At step 58, golden reference DUT 10" may be used to characterize the downlink behavior of master test chamber (e.g., to determine master test chamber downlink path loss). For example, test host 22 may direct test unit 22 to produce radio-frequency (RF) signals at a requested output power level (step 60). In response to the RF signals transmitted by test unit 22, golden reference DUT 10" may send protocol-compliant information to test unit 22 (step 62). The protocol-compliant information may indicate a power level detected internally at DUT 10" (e.g., DUT 10" may send a received signal strength indicator (RSSI) during GSM-based communications). Test host 26 may compute a golden DUT master test chamber downlink path loss by subtracting the detected power level (e.g., the receive power level as indicated by the RSSI) from the requested output power level (step 64).

At step 66, golden reference DUT 10" may be used to characterize the uplink behavior of master test chamber (e.g., to determine master test chamber uplink path loss). For example, test host 22 may direct test unit 22 to send appropriate wireless commands that configure DUT 10" to produce RF signals at a maximum output power level (step 68). If desired, test host 22 may direct DUT 10" to produce RF signals at the maximum output power by sending commands over line 28. Test unit 22 may then measure the output power level produced by DUT 10" (step 70). Test host 26 may then compute a golden DUT master test chamber uplink path loss by subtracting the measured power level (e.g., the power level measured using test unit 22) from the maximum output power level (step 72).

Processing may loop back to step 56 if there are additional channels to be tested, as indicated by path 74. Processing may loop back to step 54 if there are additional bands to be tested, as indicated by path 76. If desired, additional golden DUTs 10" may be used to calibrate master test chamber 18' for increased accuracy, as indicated by path 78.

Figure 7:
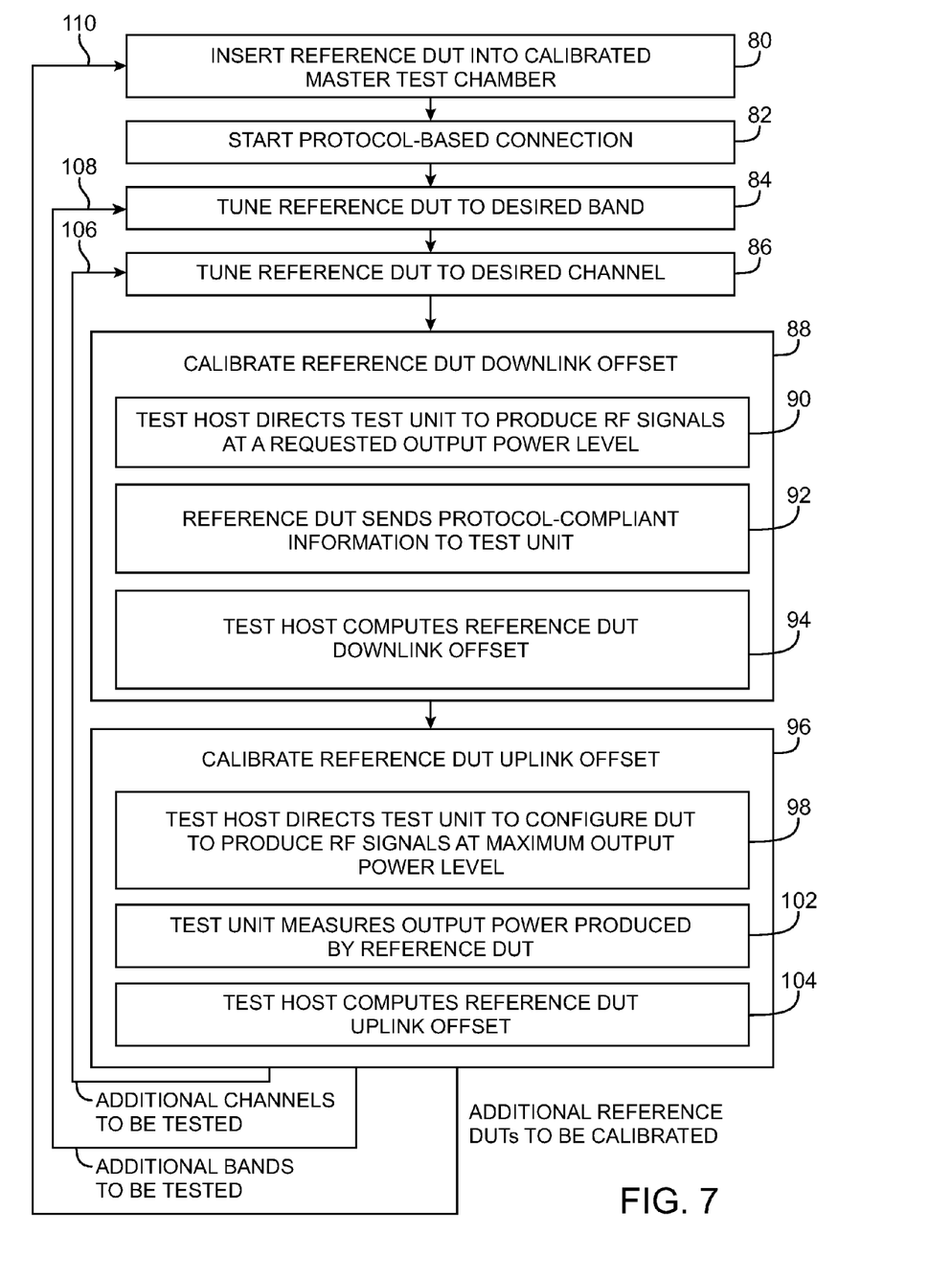
FIG. 7 is a flow chart of illustrative steps involved in calibrating reference DUTs in a calibrated master test chamber in accordance with an embodiment of the present invention.

FIG. 7 shows detailed steps (i.e., detailed steps involved in step 46 of FIG. 5) involved in calibrating test DUTs 30 in master test chamber 18'. At step 80, DUT 30 may be placed into calibrated master test chamber 18'. At step 82, test host 26 may direct reference DUT 30 to establish a protocol-based connection between antenna 9 of DUT 30 and OTA antenna 20 of master test chamber 18'.

At step 84, DUT 30 may be tuned to a desired frequency band. At step 86, DUT 30 may be tuned to a desired channel within the desired frequency band.

At step 88, the reference DUT downlink offset may be computed. For example, test host 22 may direct test unit 22 to produce RF signals at a requested output power level (step 90). In response to the RF signals transmitted by test unit 22, DUT 30 may send protocol-compliant information to test unit 22 (see, e.g., step 92, the protocol-compliant information may include a power level detected internally at DUT 30). Test host 26 may compute a reference DUT downlink path loss by subtracting the receive power level detected at DUT 30 from the requested output power level. Test host 26 may then compute a reference DUT downlink offset $DLOFF_{REF}$ by subtracting the reference DUT downlink path loss ($DLPL_{REF}$) from the master test chamber downlink path loss ($DLPL_{MASTER}$), as shown in equation 1 (step 94).

$$DLOFF_{REF} = DLPL_{MASTER} - DLPL_{REF} \quad (1)$$

At step 96, the reference DUT uplink offset may be computed. For example, test host 22 may direct test unit 22 to send appropriate wireless commands that configure DUT 30 to produce RF signals at a maximum output power level (step 98). If desired, test host 22 may direct DUT 30 to produce RF signals at the maximum output power by sending commands over line 28. Test unit 22 may then measure the output power level produced by DUT 30 (step 102). Test host 26 may compute a reference DUT uplink path loss by subtracting the output power level measured by test unit 22 from the maximum output power level. Test host 26 may then compute a reference DUT uplink offset $ULOFF_{REF}$ by subtracting the reference DUT uplink path loss ($ULPL_{REF}$) from the master test chamber uplink path loss ($ULPL_{MASTER}$), as shown in equation 2 (step 104).

$$ULOFF_{REF} = ULPL_{MASTER} - ULPL_{REF} \quad (2)$$

Processing may loop back to step 86 if there are additional channels to be tested, as indicated by path 106. Processing may loop back to step 84 if there are additional bands to be tested, as indicated by path 108. Numerous reference DUTs 30' may be calibrated to determine uplink/downlink offset values using this approach, as indicated by path 110.

Figure 8:
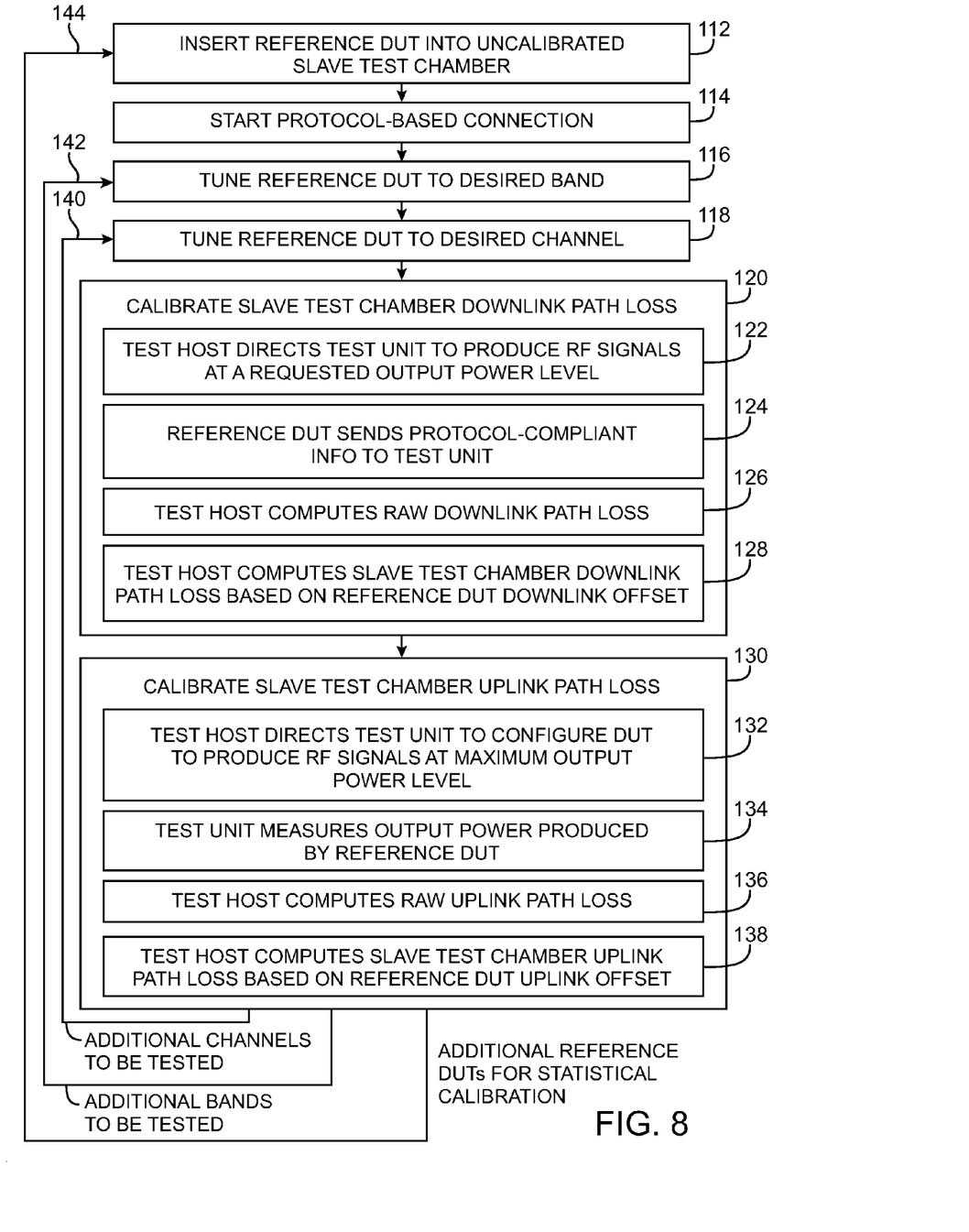
FIG. 8 is a flow chart of illustrative steps involved in calibrating multiple slave test chambers using the reference DUTs of FIG. 7 in accordance with an embodiment of the present invention.

FIG. 8 shows detailed steps (i.e., detailed steps involved in step 48 of FIG. 5) involved in calibrating slave test chambers 32 using reference DUTs 30'. At step 112, a reference DUT 30' may be placed into an uncalibrated slave test chamber 32. At step 114, test host 26 may direct reference DUT 30' to establish a protocol-based connection between antenna 9 of reference DUT 30' and OTA antenna 20 of slave test chamber 32.

At step 116, reference DUT 30' may be tuned to a desired frequency band. At step 118, reference DUT 30' may be tuned to a desired channel within the desired frequency band.

At step 120, reference DUT 30' may be used to characterize the downlink behavior of slave test chamber 32 (e.g., to determine slave test chamber downlink path loss). For example, test host 22 may direct test unit 22 to produce RF signals at a requested output power level (step 122). In response to the RF signals transmitted by test unit 22, reference DUT 30' may send protocol-compliant information that indicate a power level detected at DUT 30' to test unit 22. Test host 26 may compute a raw slave test chamber downlink path loss $DLPL_{RAW}$ by subtracting the detected power level from the requested output power level (step 126). Test host 26 may then compute a slave test chamber downlink path loss $DLPL_{SLAVE}$ by taking into account the downlink offset of reference DUT 30', as shown in equation 3 (step 128).

$$DLPL_{SLAVE} = DLPL_{RAW} - DLOFF_{REF} \quad (3)$$

At step 130, reference DUT 30' may be used to characterize the uplink behavior of slave test chamber 32 (e.g., to determine slave test chamber uplink path loss). For example, test host 22 may direct test unit 22 to send appropriate wireless commands that configure DUT 30' to produce RF signals at a maximum output power level (step 132). If desired, test host 22 may direct DUT 30' to produce RF signals at the maximum output power by sending commands over line 28. Test unit 22 may then measure the output power level produced by DUT 30' (step 134). Test host 26 may compute a raw slave test chamber uplink path loss $ULPL_{RAW}$ by subtracting the detected power level from the requested output power level (step 136). Thereafter, test host 26 may compute a slave test chamber uplink path loss by taking into account the uplink offset of reference DUT 30', as shown in equation 4 (step 138).

$$ULPL_{SLAVE} = ULPL_{RAW} - ULOFF_{REF} \quad (4)$$

Processing may loop back to step 118 if there are additional channels to be tested, as indicated by path 140. Processing may loop back to step 116 if there are additional bands to be tested, as indicated by path 142. Additional reference DUTs 30' may be used to measure $DLPL_{SLAVE}$ and $ULPL_{SLAVE}$ to obtain statistical data to populate entries in path loss table 176 of FIG. 3.

Each reference DUT 30' may be tested at least twice (e.g., by placing, testing, removing, and replacing a given reference DUT 30' in the slave test chamber for multiple calibration iterations) to confirm that valid and repeatable measurement data is being acquired.

For example, slave test chamber uplink path loss values of 20 dB, 21 dB, and 23 dB may be measured at CH1, BAND1 using REFDUT1 (see, e.g., FIG. 3). REFDUT1 may be a reliable reference DUT because these path loss values are relatively close in magnitude. In contrast, slave test chamber uplink path loss values of 20 dB 21 dB, and 28 dB may be measured at CH1, BAND1 using REFDUT2. REFDUT2 may be an unreliable reference DUT because these path loss values are inconsistent (e.g., a data set with a large standard deviation is undesirable). Data (e.g., slave test chamber uplink and down path loss values) gathered using REFDUT2 may therefore be discarded or ignored.

Figure 9:
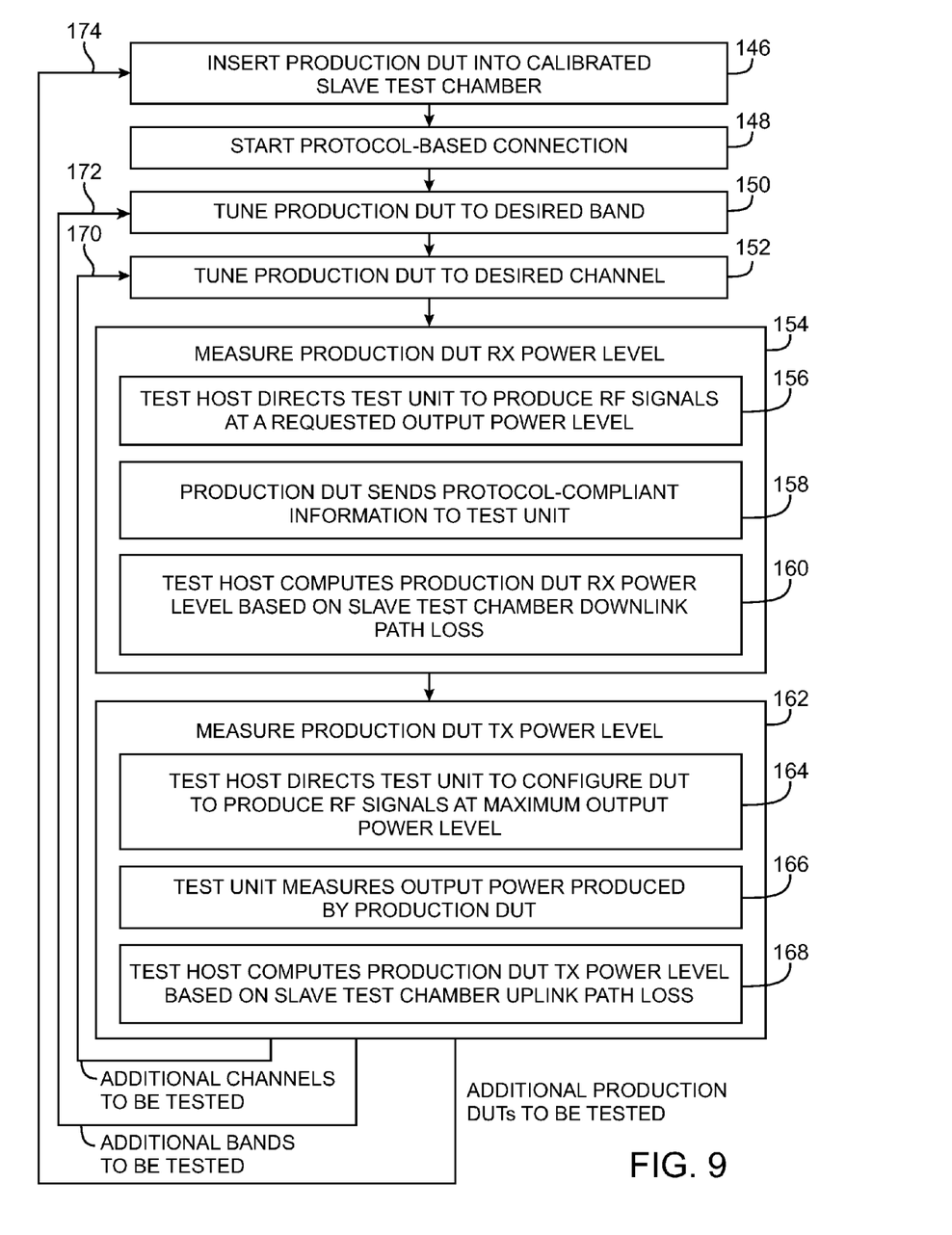
FIG. 9 is a flow chart of illustrative steps involved in testing production DUTs in calibrated slave test chambers in accordance with an embodiment of the present invention.

FIG. 9 shows detailed steps (i.e., detailed steps involved in step 50 of FIG. 5) involved in testing production DUTs 10 in calibrated slave test chambers 32'. At step 146, a production (factory) DUT 10 may be placed into slave test chamber 32'. At step 148, test host 26 may direct production DUT 10 to establish a protocol-based connection between antenna 9 of DUT 10 and OTA antenna 20 of slave test chamber 32'.

At step 150, DUT 10 may be tuned to a desired frequency band. At step 152, DUT 10 may be tuned to a desired channel within the desired frequency band.

At step 154, the receive (RX) power level of production DUT 10 may be computed. For example, test host 22 may direct test unit 22 to produce RF signals at a requested output power level (step 156). In response to the RF signals transmitted by test unit 22, DUT 10 may send protocol-compliant information to test unit 22 (step 158). The protocol-compliant information may include a power level detected internally at DUT 10. Test host 26 may then compute the RX power level of production DUT 10 by adding an average slave test chamber downlink path loss $DLPL_{SLAVE,AVG}$ to the power level detected internally at DUT 10. The value of $DLPL_{SLAVE,AVG}$ may be calculated based on the average of the slave test chamber downlink path loss values recorded in table 176 using the reliable reference DUTs 30'. The computed RX power level may be compared with the requested power level to determine whether that production DUT 10 passes the pass/fail criteria.

For example, consider a scenario in which the requested output power is −58 dBm, $DLPL_{SLAVE,AVG}$ is 29.7 dB, and the RSSI transmitted by DUT 10 indicates a receive power level of −92 dBm. The RX power level of DUT 10 is therefore equal to −62.3 dBm (−92 plus 29.7). An RX power loss of 4.3 dB (−58 minus −62.3) may not be acceptable (i.e., DUT 10 is marked as a failing DUT).

At step 162, the transmit (TX) power level of production DUT 10 may be computed. For example, test host 22 may direct test unit 22 to send appropriate wireless commands that configure DUT 10 to produce RF signals at a maximum output power level (step 156). If desired, test host 22 may direct DUT 10 to produce RF signals at the maximum output power by sending commands over line 28. Test unit 22 may then measure the output power level produced by DUT 10 (step 166). Test host 26 may then compute the TX power level of production DUT 10 by adding an average slave test chamber uplink path loss $ULPL_{SLAVE,AVG}$ to the power level measured by test unit 22. The value of $ULPL_{SLAVE,AVG}$ may be calculated based on the average of the slave test chamber uplink path loss values recorded in table 176 using the reliable reference DUTs 30'. The computed TX power level may be compared with the maximum power level to determine whether that production DUT 10 passes the pass/fail criteria.

For example, consider a scenario in which the desired maximum output power is 30 dBm, $DLPL_{SLAVE,AVG}$ is 20.4 dB, and the power level measured by test unit 22 is 7.6 dBm. The TX power level is therefore equal to 28 dBm (7.6 plus 20.4). A TX power loss of 2 dB (30 minus 28) may be acceptable and DUT 10 is therefore marked as a passing DUT.

Processing may loop back to step 152 if there are additional channels to be tested, as indicated by path 170. Processing may loop back to step 150 if there are additional bands to be tested, as indicated by path 172. Additional production DUTs (e.g., hundreds or thousands of DUTs) may be tested in slave test chambers 32' using this approach, as indicated by path 174.

The steps shown in FIGS. 6-9 are merely illustrative. If desired, uplink and downlink characterization can be performed in any order. If desired, only the uplink path loss may be measured for time division duplexing systems in which the uplink path loss and downlink path loss are equivalent.

The foregoing is merely illustrative of the principles of this invention and various modifications can be made by those skilled in the art without departing from the scope and spirit of the invention.

What is claimed is:

1. A method of calibrating a test station with a reference device under test, wherein the test station includes a test chamber having an over-the-air antenna, a test unit, and a radio-frequency cable that connects the over-the-air antenna to the test unit, the method comprising:
    calibrating a master test chamber that is different than the test chamber using a golden reference device under test that includes storage circuitry and that is placed within the master test chamber;
    calibrating the reference device under test in the calibrated master test chamber to obtain a reference offset; and
    with the reference device under test, calibrating the test chamber by computing a path loss based on the reference offset.

2. The method defined in claim 1, wherein computing the path loss based on the reference offset comprises computing an uplink path loss for the test chamber.

3. The method defined in claim 1, wherein computing the path loss based on the reference offset comprises computing a downlink path loss for the test chamber.

4. The method defined in claim 1, further comprising:
    storing the reference offset in the reference device under test; and
    with a test host, retrieving the reference offset from the reference device under test to compute the path loss.

5. The method defined in claim 1, wherein the test station is connected to computing equipment, the method further comprising:
    storing the reference offset on a database that is stored on the computing equipment; and
    with a test host, retrieving the reference offset from the database to compute the path loss.

6. The method defined in claim 1, further comprising:
    with the test station, testing a plurality of production devices under test.

7. The method defined in claim 1, wherein the path loss comprises an over-the-air path loss and wherein calibrating the master test chamber with the golden reference device under test comprises measuring an over-the-air path loss value associated with the master test chamber.

8. A method for performing over-the-air wireless testing on a factory device under test with a test station, wherein the test station includes a test chamber having an over-the-air antenna, a test unit, and a radio-frequency cable that connects the over-the-air antenna to the test unit, wherein the test station is connected to computing equipment, and wherein the computing equipment stores a path loss table, the method comprising:
    with a plurality of reference devices under test, calibrating the test station;
    with the test host, computing path loss values for the path loss table based on measurements taken from the plurality of reference devices under test;
    directing the factory device under test to transmit radio-frequency signals to the over-the-air antenna;

with the test unit, measuring a test unit power level while the factory device under test is transmitting the radio-frequency signals to the over-the-air antenna; and with a test host, computing a transmit power level for the factory device under test based on the test unit power level and an average uplink path loss value computed using measured uplink path loss values in the path loss table.

9. The method defined in claim 8, further comprising:

with the test unit, transmitting radio-frequency signals through the over-the-air antenna to the factory device under test;

in response to the radio-frequency signals transmitted from the test unit, transmitting wireless information to the test unit with the factory device under test; and with the test host, computing a receive power level for the factory device under test based on the wireless information and an average downlink path loss value computed using measured downlink path loss values in the path loss table.

10. The method defined in claim 9, wherein transmitting the wireless information to the test unit with the factory device under test comprises transmitting a received signal strength indicator to the test unit with the factory device under test.

11. The method defined in claim 8, wherein each reference device under test has a respective reference offset and wherein computing the path loss values for the path loss table based on the measurements taken from the plurality of reference devices under test comprises computing uplink and downlink path loss values while taking into account the reference offset of each reference device under test.

12. The method defined in claim 11, further comprising:
calibrating each of the plurality of reference devices under test in a master test chamber to determine their respective reference offset.

13. A method of calibrating a test station with a plurality of reference devices, wherein the test station includes a slave test chamber having an antenna, a test unit, and a radio-frequency cable that connects the antenna to the test unit, the method comprising:

with a golden reference device that includes storage circuitry, calibrating a master test chamber by taking wireless signal measurements in the master test chamber;

calibrating the plurality of reference devices in the master test chamber; and with the plurality of reference devices, calibrating the slave test chamber by computing a slave test chamber path loss.

14. The method defined in claim 13, wherein calibrating the plurality of reference devices in the master test chamber comprises computing reference offset values for each of the plurality of reference devices.

15. The method defined in claim 14, wherein calibrating the slave test chamber comprises computing an average uplink path loss based on the reference offset values.

16. The method defined in claim 14, wherein calibrating the slave test chamber comprises computing an average downlink path loss based on the reference offset values.

17. The method defined in claim 13, further comprising:
testing a plurality of factory devices in the slave test chamber.

18. The method defined in claim 13, further comprising, wherein calibrating the master test chamber comprises making over-the-air path loss measurements using an antenna in the golden reference device.

* * * * *